May 19, 1964  F. B. CUMMINGS  3,133,573
SEED POTATO CUTTER WITH FEED CHAIN
Filed Dec. 29, 1960  5 Sheets-Sheet 1
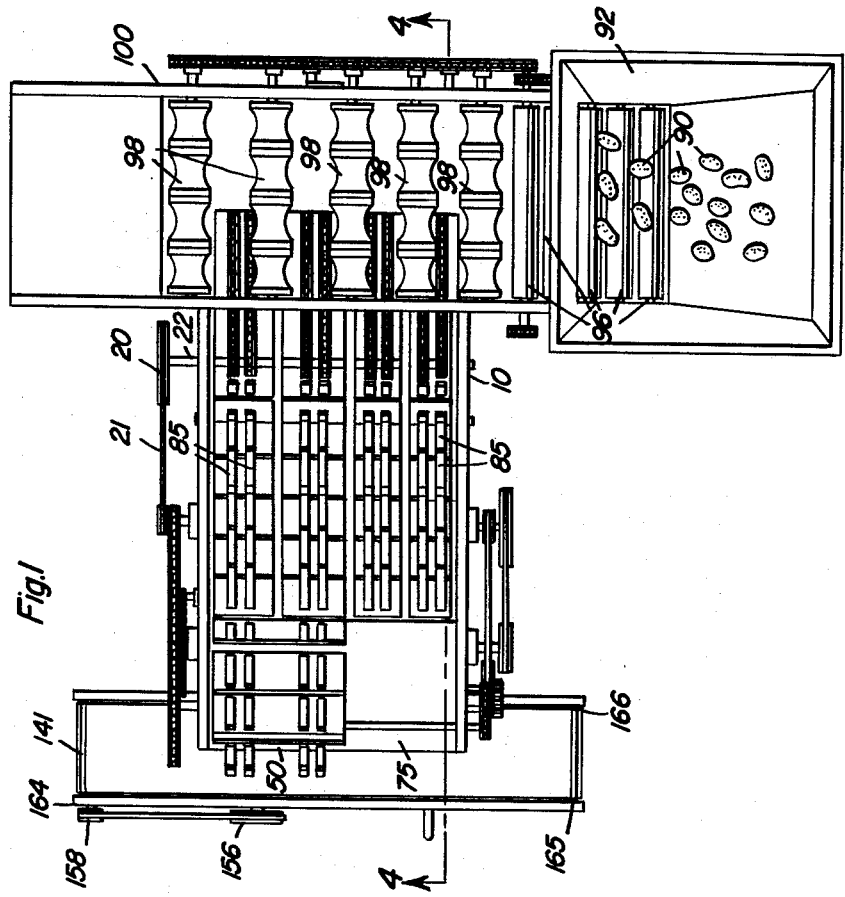
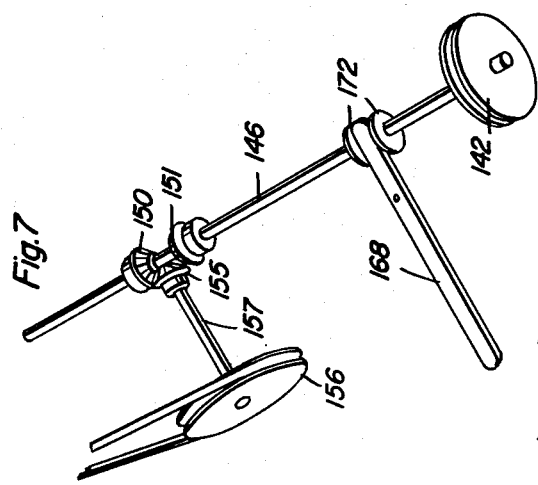
Frank B. Cummings
INVENTOR.

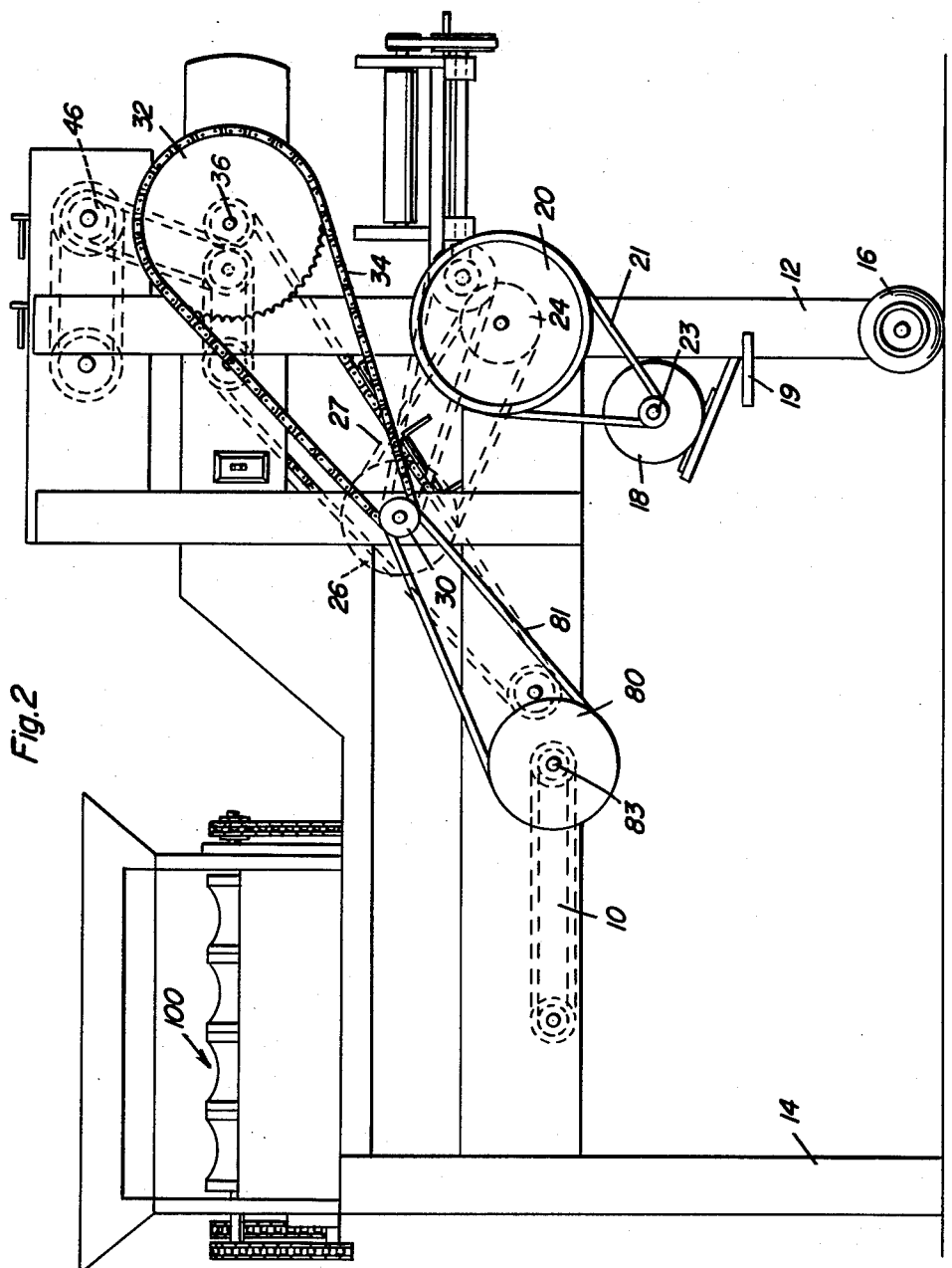

May 19, 1964  F. B. CUMMINGS  3,133,573
SEED POTATO CUTTER WITH FEED CHAIN
Filed Dec. 29, 1960  5 Sheets-Sheet 3

Frank B. Cummings
INVENTOR.

May 19, 1964  F. B. CUMMINGS  3,133,573
SEED POTATO CUTTER WITH FEED CHAIN
Filed Dec. 29, 1960  5 Sheets-Sheet 4
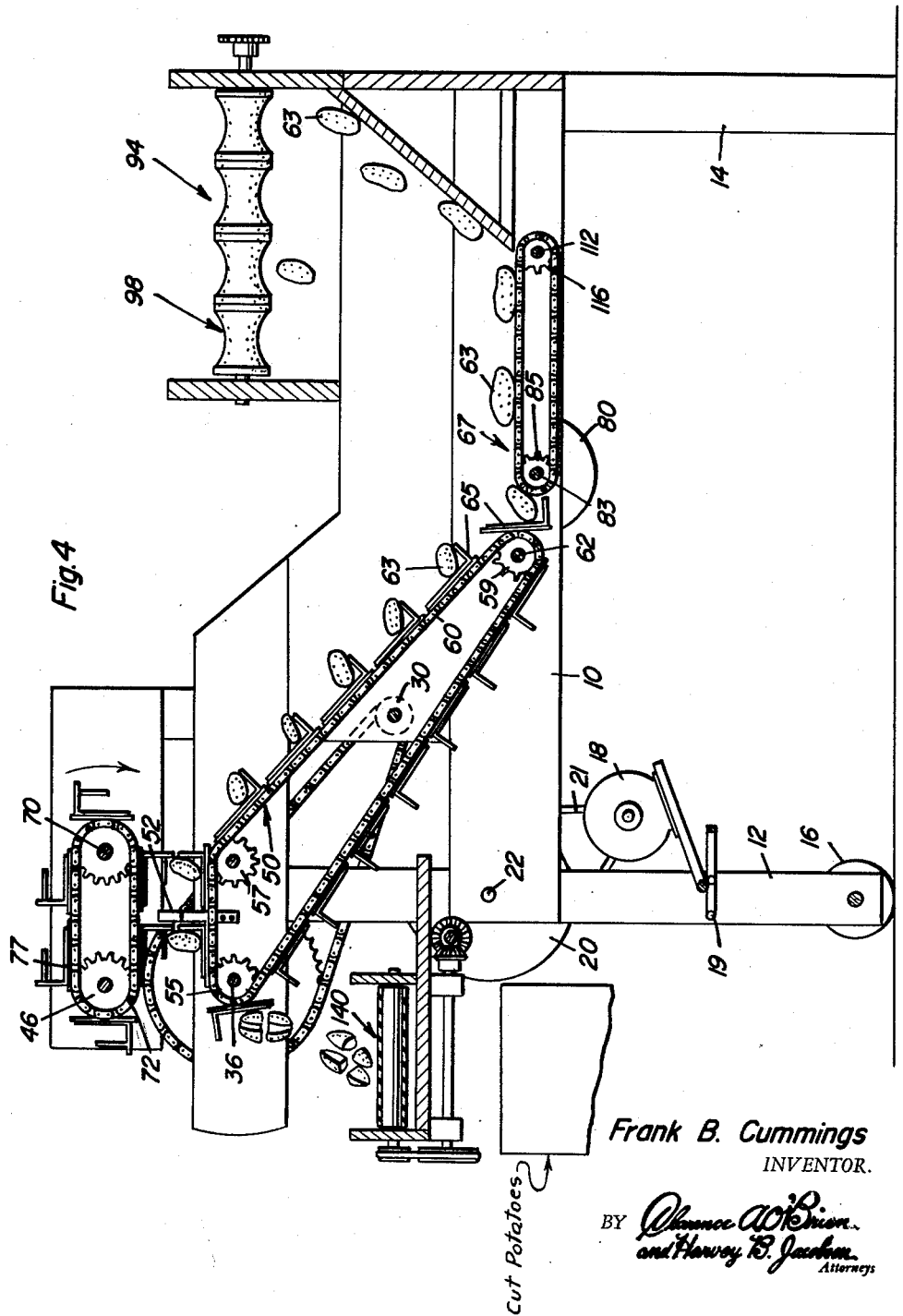
Frank B. Cummings
INVENTOR.

May 19, 1964 F. B. CUMMINGS 3,133,573
SEED POTATO CUTTER WITH FEED CHAIN
Filed Dec. 29, 1960 5 Sheets-Sheet 5
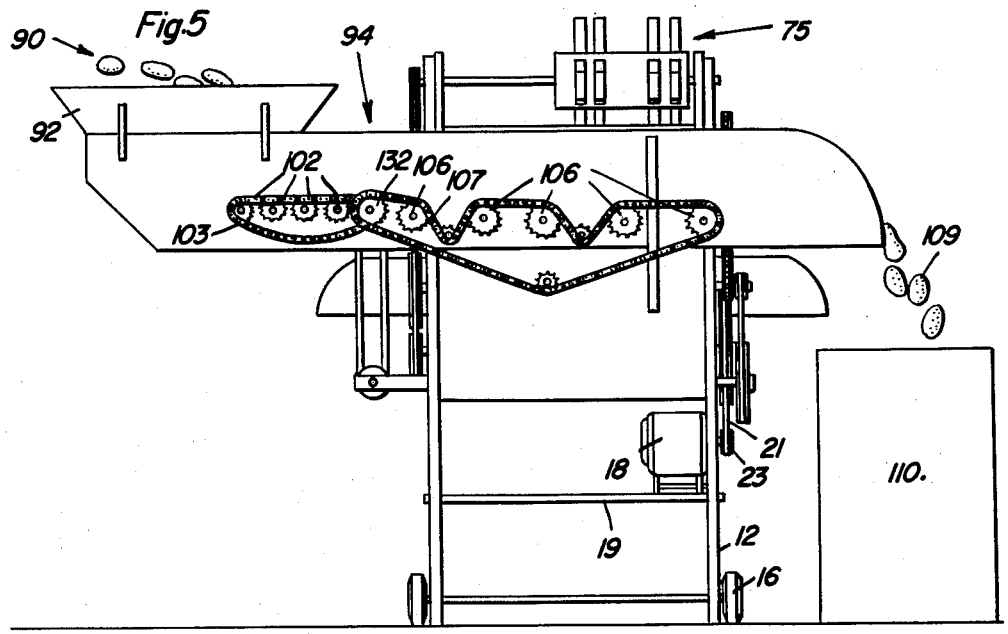
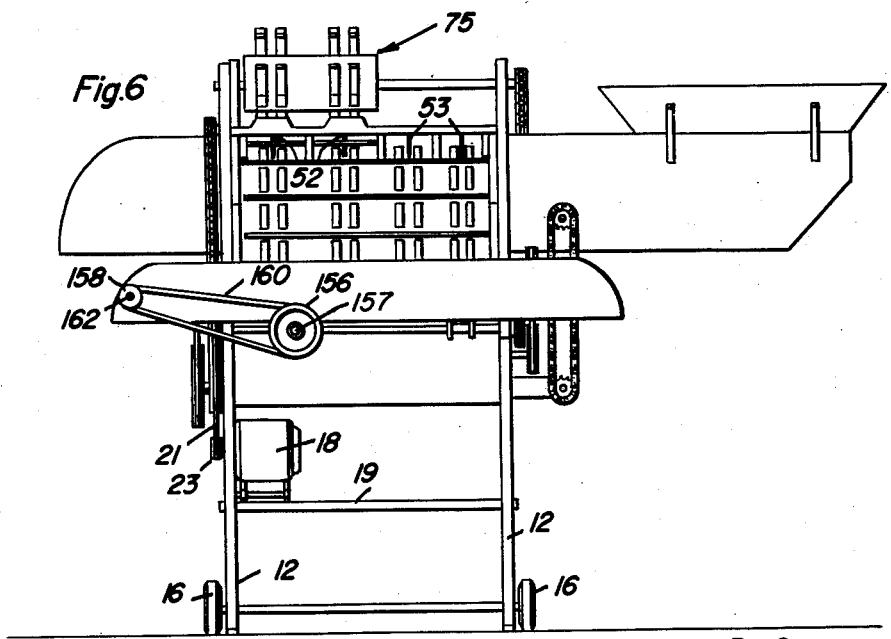
Frank B. Cummings
INVENTOR.

United States Patent Office 3,133,573
Patented May 19, 1964

3,133,573
SEED POTATO CUTTER WITH FEED CHAIN
Frank B. Cummings, Bangor, Maine; Anna L. Cummings, R.F.D. 1, Box 134, Carmel, Maine, executrix of said Frank B. Cummings, deceased
Filed Dec. 29, 1960, Ser. No. 79,422
4 Claims. (Cl. 146—163)

This invention relates to a seed potato cutter and more particularly to an improved seed potato grader and cutter whereby the potatoes are initially graded and selected sizes fed by means of an endless conveyor bed to cutting knives and the potatoes cut in quarter or half sections evenly and uniformly.

An object of the invention is to provide a seed potato cutting machine of the character described wherein means is employed for separating the potatoes as to size and thereafter elevating and pushing certain selected size potatoes through knifes to cut the same in a block-type cut for seed purposes.

Another object of the invention is to provide a seed potato grader and cutter which is fully automatic and wherein horizontally arranged knives are utilized to quarter medium size potatoes, and vertically arranged knives being employed for cutting smaller size potatoes in half.

Another object of the invention is to provide an improved seed potato grader and cutter as aforementioned wherein an overhead actuated bed is operated in conjunction with a main carrier bed to assist in pushing the larger selected size potatoes through the cutting knives. This eliminates any tendency toward clogging and sticking of the potato cutter as has been encountered heretofore in conventional potato seed cutting machines.

Another object of the invention is to provide a seed potato cutter which sorts or grades the potatoes as to size and whereby potatoes larger than about four inches in diameter are separated and left uncut with the medium sized potatoes quartered and the smaller size cut in half.

Another object of the invention is to provide a potato cutter of the character described which is of relatively simple construction, easy to operate and a machine which is durable and efficient in use.

With these and other objects and advantages which will occur to those skilled in the art from the following description, the invention consists in the novel features of construction and combination and arrangement of parts as will be hereinafter described and illustrated in the drawings with respect to an embodiment thereof. The drawings, as will be understood, illustrate a preferred embodiment of the invention, and wherein:

FIGURE 1 is a top plan view of a potato cutter constructed in accordance with my invention and embodying the improved features and arrangement of parts as hereinafter described;

FIGURE 2 is a side elevational view on an enlarged scale of the machine illustrated in FIGURE 1.

FIGURE 4 is a longitudinal sectional view of the machine taken substantially on the line 4—4 of FIGURE 1;

FIGURE 5 is an end elevation view of the machine taken from the grader end of the machine and illustrating the mechanism for driving the grader;

FIGURE 6 is an end elevation view of the machine opposite to FIGURE 5; and

FIGURE 7 is a fragmentary detail view on an enlarged scale in perspective and showing the reversing lever and gearing arrangement for operating the machine.

Figure 3:
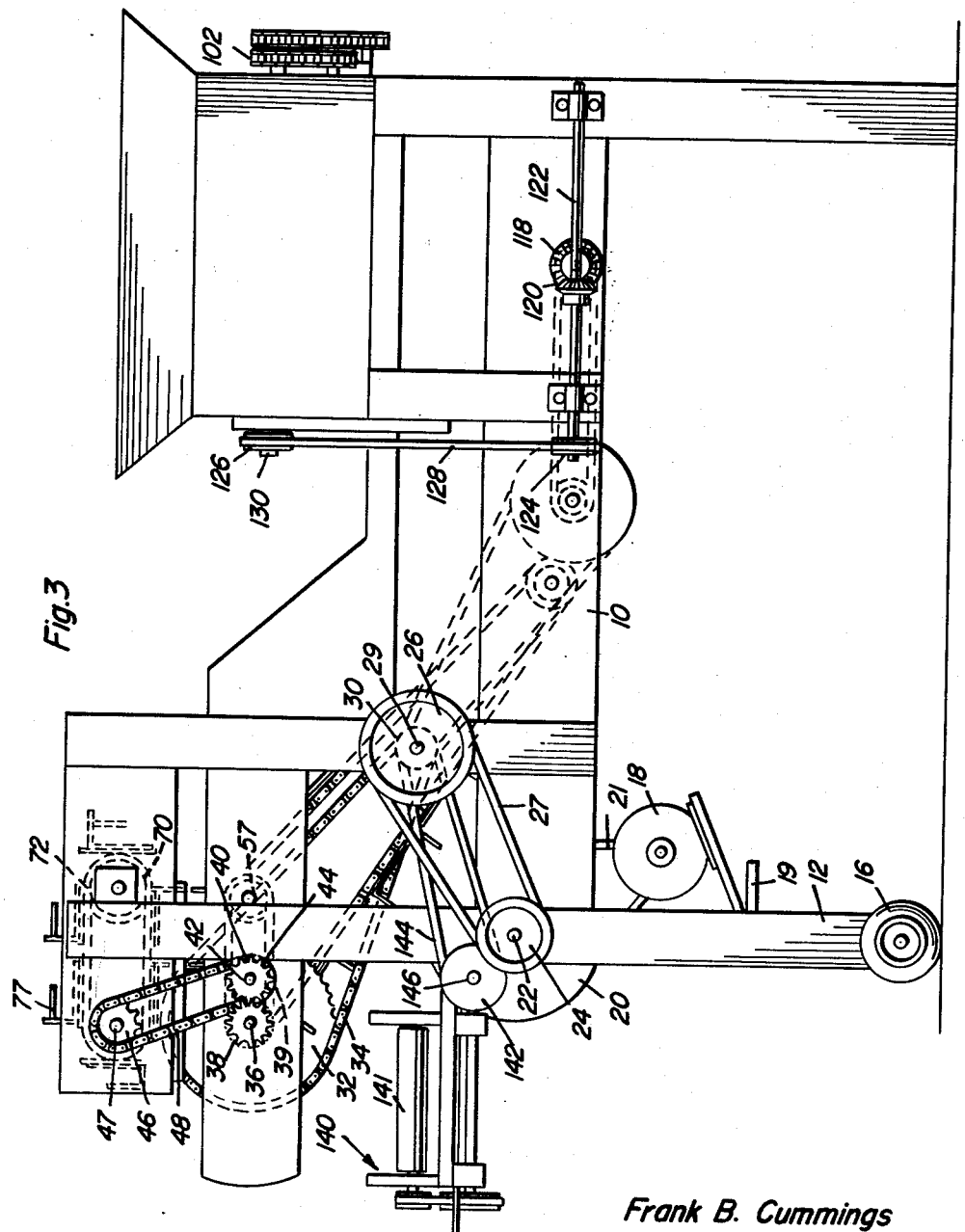
FIGURE 3 is another side elevation view of the machine from the side opposite FIGURE 2.

Referring to the drawings, and FIGURES 1 through 6 in more detail, the improved potato cutter of the present invention comprises a horizontal frame 10 carried by spaced pairs of supporting leg members 12 and 14, leg members 12 being arranged to support one end of the machine while leg members 14 support the other end. To permit the machine to be moved from one location to another, the pair of leg members 12 are suitably supported by wheels 16 as shown in FIGURES 2 through 6.

The machine is suitably driven by a motor 18 supported on a cross bar 19 carried by the leg members 12. The motor 18 drives large pulley 20 through a V-belt 21. The pulley 20 is keyed to a shaft 22 and V-belt 21 is engaged over output pulley 23 on the motor 18.

Shaft 22 is illustrated in FIGURES 2 and 3 and has attached thereto, on the opposite end from the pulley 20, a pulley 24. Pully 24 is drivingly connected to a pulley 26 by means of a V-belt drive 27. The pulley 26 is keyed to shaft 29 extends through the depth of the machine and drives the pulley 30 and roller link sprocket arranged in back of the pulley and which drives the sprocket wheel 32 by means of a sprocket drive chain 34.

The sprocket wheel 32 is keyed to the shaft 36 which shaft extends through the machine and drives a sprocket 38, the latter being drivingly engaged with a like sprocket wheel 40 attached to the shaft 42. A sprocket pinion 44 on shaft 42 is arranged to drive sprocket 46 which is keyed to shaft 47, which drives sprocket chain 48 whereby the mechanism operates an endless traveling bed or elevator 50 for elevating potatoes to the cutting means. This elevator bed 50 carries potatoes upwardly and through the cutting knives 52 and 53 as illustrated best in FIGURES 4 and 6. The endless bed 50 for receiving and elevating potatoes is inclined upwardly and is driven by a sprocket wheel 55 on shaft 36, the latter being operatively connected to sprocket wheels 57 and 59 by a sprocket drive chain 60. The sprocket wheel 59 is keyed to the shaft 62 which extends through the machine, the shaft being adjustable to vary the slope of the elevator bed 50 as desired. For supporting and carrying the potatoes which is shown at 63 on the endless bed 50 there is provided L-shaped bracket members 65 which are suitably mounted on the body of the bed 50 as illustrated in FIGURE 4. These L-shaped bracket members are arranged to pivot about as the bed passes around the lower sprocket driven shaft 62 so that the same pick up potatoes as delivered to the bed from the coacting endless potato feed chain means, generally designated 67.

In FIGURES 3 and 4, as will be observed, the driven sprocket 46 is connected to sprocket 70 through chain means 72, and the mechanism is arranged to drive an upper auxiliary bed 75. This bed 75 comprises L-shaped bracket members 77 which are spacedly mounted on the bed and arranged to engage and assist in pushing potatoes evenly through the cutting knives 52 as the same are presented to the knives by the endless potato traveling bed 50. Utilizing the coacting endless beds 50 and 75, and by driving the beds so that they travel in opposite directions, relative to the stationary knives, the potatoes are cut squarely and cleanly without crushing or bruising them. This provides an important improvement feature of my seed potato cutter machine.

Referring to FIGURE 2 the pulley 30 on the driven shaft 29 drives pulley 80 by means of the V-belt 81, pulley 80 being suitably keyed to shaft 83 which extends through the machine. Further, as best shown in FIGURES 1 and 4, shaft 83 has attached eight roller link sprockets, generally designated 85 which are of similar construction, and which are suitably spaced across the machine as illustrated in FIGURE 1. These sprocket means drive the feed chains 67 as shown in FIGURE 4 which carry the potatoes such as shown at 63 to the elevator bed 50 where they are picked up by the L-shaped bracket potato carriers 65 and carried upwardly to the knives.

Referring more particularly to FIGURES 1, 4 and 5 potatoes, such as indicated by the reference character 90 are dumped into a hopper 92 of a grader or sizer and generally designated 94. The potato grader comprises a plurality of wooden rollers 96 which are spaced horizontally, as shown, and adapted to carry the potatoes from the feed hopper 92 and onto the sizing spools 98, the latter being preferably formed of hard rubber. Rollers 96, as shown in FIGURES 1 and 5, are suitably journaled in the grader bed 100, and the same are provided with a driving sprocket means 102, mounted on the outer ends and which are equipped with an actuating sprocket chain means 103. Similarly arranged sprockets 106 are driven by a sprocket chain means 107.

Oversized potatoes 109 e.g. larger than four inches in diameter, pass over the spools 98 and through the grader and are deposited in a receptacle 110 as illustrated in FIGURE 5. These large size potatoes are left uncut as heretofore described.

Referring to FIGURES 3 and 4, the shaft 112, on which are mounted the sprockets 116 of the endless chain potato carrier 67, is drivingly connected through a miter gear 118 which engages gear 120 on the shaft 122 to which the same is keyed.

The shaft 122 is connected to a pulley 124 which drives the pulley 126 through a V-belt 128. Pulley 126 is keyed to the shaft 130 which extends through the grader mechanism and drives a sprocket 132 which operates the grader 94.

The potatoes to be cut when operating the machine are dumped into the hopper of the grader as illustrated in FIGURE 4 and are sized by the rubber spools 98 as heretofore explained. These spools are preferably arranged in five rows of spools as shown in the embodiment illustrated. The potatoes, which have been sized, fall to the feed chain of the endless conveyor 67 and are carried to the endless elevator bed 50 which carries the potatoes to the knives 52 and 53 at the top of the machine as heretofore described. Referring to FIGURE 6 it will be seen that the potatoes to be halved are carried to the knives 52 whereas the larger medium size potatoes which are to be quartered, are carried to the knives 52 and 53. The upper endless auxiliary bed 75, as heretofore explained, is operated to apply uniform pressure to the potatoes as the same are quartered. The potatoes after being cut drop to the conveyor, generally designated at 140, and which comprises a travelling endless belt 141.

Referring to FIGURE 3, and the conveyor belt driving mechanism on the conveyor it will be seen that the pulley 24 is drivingly connected to shaft 29 as heretofore explained and which drives pulley 142 by means of a V-belt 144. The pulley 142 is keyed to shaft 146. Miter gears 150 and 151 are arranged on shaft 146, the same being keyed thereto and cooperate with a center gear 155, which is connected to shaft 157, and extends crosswise of the conveyor being secured firmly in place. This shaft 146 is movable from left to right, as shown in the drawings, to permit gears 150 and 151 to be alternately engaged thus giving a right or left motion to the conveyor belt 141.

Referring to FIGURE 6 it will be seen that shaft 157 is attached to a pulley 156 which drives pulley 158 by means of a V-belt 160. The pulley 158 is keyed to shaft 162 which is in turn connected to a roller 164 which drives the conveyor belt 141. Shaft 165 also comprises spaced wooden rollers 166 which serves to drivingly support and space the conveyor belt 141.

In FIGURE 7 the lever arrangement as at 168 provides a reversing means for operating the conveyor belt 141. The lever 168 is arranged to engage between lugs 172 on shaft 146 to permit sliding of this shaft whereby to shift gears 150 and 151, thus permitting reverse operation of the conveyor belt as desired.

The arrangement described and illustrated provides a compact machine for handling a large quantity of seed potatoes and selectively cutting the predetermined sizes into halves or quarters depending upon the particular size of potato being cut for seed purposes. The machine of the invention is compact and readily movable about and very efficient in its operation.

While I have described a preferred embodiment of my invention and described novel elements and improvements in a potato seed cutter, it will be understood that my invention is susceptible to various modifications and changes which will occur those skilled in the art, and which can be made without departing from the spirit and scope of my invention, the same being more particularly set forth in the claims appended hereto.

What is claimed as new is as follows:

1. A seed potato cutter comprising a frame, cutting knives arranged on said frame for cutting potatoes, an endless traveling bed mounted on the frame in alignment with the cutting knives, a plurality of outwardly extending bracket means mounted on the traveling bed for receiving potatoes and carrying the same to the cutting knives to cut said potatoes, and an auxiliary endless bed mounted on the frame and disposed above the cutting knives and traveling bed, auxiliary brackets mounted on the auxiliary bed and extending outwardly therefrom a distance substantially equaling the distance between the auxiliary bed and the top of the outwardly extending bracket means on the traveling bed, said auxiliary brackets each including a forward projecting portion secured thereto at a point outwardly from the auxiliary bed and spaced from the traveling bed a sufficient distance so as to confine predetermined size potatoes against upward movement from the traveling bed during cutting, said auxiliary bed and auxiliary brackets being operable with said traveling bed and outwardly extending bracket means on the traveling bed to coact therewith for applying uniform pressure to the potatoes during cutting whereby the same are severed squarely and cleanly.

2. The combination of claim 1 including a grader positioned adjacent and above the end of the traveling bed remote from the cutting knives, said grader extending transverse of the direction of travel of the traveling bed and beyond each edge of said traveling bed, said grader including two sets of rotating rollers, said rollers being spaced apart transversely of the traveling bed, a first set of rollers positioned adjacent a first end of the grader and extending to approximately mid-width of the traveling bed, the rollers of said first set of rollers being spaced apart a sufficient distance so as to allow relatively small potatoes to pass therethrough while retaining the larger size potatoes, the second set of rollers extending from the first set to the second end of the grader, said second set of rollers being spaced apart a sufficient distance so as to allow medium size potatoes to pass therethrough while retaining the large potatoes for disposal at a point laterally spaced from the traveling bed.

3. The combination of claim 2 including a transversely extending conveyor positioned below the discharge end of the traveling bed and the cutting knives for accommodating the cut potatoes, drive means driving the conveyor, and means for reversing the direction of travel of the conveyor thereby enabling the discharge of the cut potatoes laterally from either side of the cutter.

4. The combination of claim 1 including a transversely extending conveyor positioned below the discharge end of the traveling bed and the cutting knives for accommodating the cut potatoes, drive means driving the conveyor, and means for reversing the direction of travel of the conveyor thereby enabling the discharge of the cut potatoes laterally from either side of the cutter.

References Cited in the file of this patent

UNITED STATES PATENTS

| 1,099,205 | Ryan | June 9, 1914 |
| 1,961,009 | Nachtigal | May 29, 1938 |
| 2,752,967 | Sylvain | July 3, 1956 |
| 2,983,376 | Troyer | May 9, 1961 |

FOREIGN PATENTS

| 226,841 | Australia | Feb. 11, 1960 |